United States Patent [19]

Kagawa et al.

[11] Patent Number: 4,812,374

[45] Date of Patent: Mar. 14, 1989

[54] ANODE ACTIVE MATERIAL AND ALKALINE CELLS CONTAINING SAME, AND METHOD FOR THE PRODUCTION THEREOF

[75] Inventors: Keiichi Kagawa, Takehara; Kiyoshi Taniyasu, Hiroshima, both of Japan

[73] Assignee: Mitsui Mining & Smelting Co., Ltd., Tokyo, Japan

[21] Appl. No.: 479,509

[22] Filed: Mar. 28, 1983

[30] Foreign Application Priority Data

Apr. 19, 1982 [JP] Japan ................................. 57-63930
Jun. 23, 1982 [JP] Japan ............................... 57-106686

[51] Int. Cl.$^4$ ............................................. H01M 4/42
[52] U.S. Cl. ...................................... 429/50; 429/229; 429/230
[58] Field of Search ............... 429/226, 230, 122, 106, 429/229, 50; 420/513; 252/182.1

[56] References Cited

U.S. PATENT DOCUMENTS

| | | | |
|---|---|---|---|
| 645,261 | 3/1900 | Irving | 429/226 |
| 2,982,806 | 5/1961 | Voss | 429/230 |
| 3,764,389 | 12/1973 | Hsia et al. | 429/230 |
| 4,376,810 | 3/1983 | Takeda et al. | 429/230 |
| 4,432,937 | 2/1984 | Kuwayama et al. | 420/513 |

FOREIGN PATENT DOCUMENTS

| | | | |
|---|---|---|---|
| 2054094 | 5/1972 | Fed. Rep. of Germany | 429/230 |
| 33320 | 4/1956 | Japan | 429/230 |

OTHER PUBLICATIONS

Ikeda, Mechanically Rechargeable Zinc-Air Battery, Rechargeable Batteries in Japan, Ed. by Y. Miyake and A. Kozawa, JEC Press, 1977, pp. 417–420.

*Primary Examiner*—Donald L. Walton
*Attorney, Agent, or Firm*—Bucknam and Archer

[57] ABSTRACT

An anode active material of zinc powder with indium coexisting therewith, the metals being amalgamated, an alkaline cell using the anode active material therein, and a method for the production of the anode active material or the alkaline cell.

7 Claims, No Drawings

ANODE ACTIVE MATERIAL AND ALKALINE CELLS CONTAINING SAME, AND METHOD FOR THE PRODUCTION THEREOF

This invention relates to an anode material for batteries and a method for producing the anode material and also to an alkaline cell using the anode material therein and a method for producing the cell. More particularly, it relates to an anode active material composed of amalgamated zinc powder and used to inhibit the evolution of gases in alkaline cells etc. and a method for producing the anode active material and also to an improved alkaline cell using the anode active material and a method for producing the improved alkaline cell.

Alkaline cells and the like in which zinc is used as the anode active material, must be of a closed type since they use a strong alkaline electrolyte such as an aqueous solution of potassium hydroxide. The fact that the cells are of a closed type is particularly important in making them compact-sized and, at the same time, results in closing therein hydrogen gas evolved due to corrosion of the zinc during storage of the cells. Accordingly, the gas pressure in the cells will increase during long-term storage whereby a possible danger such as explosion may be incurred more frequently the more perfectly the closing of the cells is effected. As a countermeasure to eliminate this possibility, there have been proposed various cells which are so structurally designed as to selectively introduce such a gas produced in the cells to the outside; however, the cells so proposed are not fully satisfactory. Thus, studies were made in an attempt to prevent the corrosion of a zinc anode active material in cells thereby lessening the evolution of gases in the interior of the cells and, as a result of the studies, amalgamated zinc taking advantage of a high hydrogen overvoltage of mercury has been prevalently used. However, the anode active material used in alkaline cells now on market contains mercury in an amount of as much as about 5–15% and is apt to endanger human bodies and other living matter and cause environmental contamination.

Thus there have also been proposed alkaline cells in which is used a zinc electrode incorporated with lead (Pb) or the like instead of mercury thereby to inhibit the evolution of gases. Such incorporated elements are effective to some extent in inhibiting such gas evolution; however, they cannot be a substitute for mercury at present from the viewpoint of effectiveness. In addition, there has further been proposed a method comprising immersing zinc powder in a mercury ion-containing acidic solution incorporated with Pb, Cd and similar ions to amalgamate the zinc powder by means of cementation simultaneously with adding the Pb, Cd and the like to the zinc powder; however, also these methods are not conducive to decreasing the amount of mercury to be used therein and inhibiting the gas evolution effectively.

In view of the drawbacks of the aforesaid conventional methods, an object of this invention is to provide an alkaline cell wherein is used a novel anode active material containing a remarkably decreased amount of mercury required to inhibit hydrogen gas evolution from an anode active material and enabling the cell performance to be improved.

This and other objects of this invention will be apparent from the following description.

The present inventors have found that in an anode active material comprising zinc, the simultaneous use of mercury and indium will result not only in exhibiting the effect of at least the same level of hydrogen gas evolution thus reducing the necessary mercury amount of conventional anode active material composed of merely amalgamated zinc, but also in improving the cell performance. This invention is primarily based on this finding.

It has also been found that when used with mercury, thallium is another element that will exhibit, like the indium, the marked effect of reducing the hydrogen gas evolution. Thus, according to this invention, there may be provided alkaline cells in which the level of hydrogen gas evolution is substantially lowered with a minimum amount of mercury present in the zinc anode.

Conventional anode active materials composed simply of amalgamated zinc powder have a 5–15% content of mercury, while the anode active materials according to this invention may have a mercury content of as low as 1% or less to inhibit gas evolution to at least the same extent as the conventional ones and still improve cell performance. It is of course possible to increase the mercury content of the anode active material of this invention and enhance the function of the anode active material accordingly. From a practical point of view, the anode active material of this invention having a mercury content of about 5% or less will exhibit a sufficiently superior effect as compared with a conventional one composed of amalgamated zinc powder having a 5–15% mercury.

The indium content of the novel anode active material of this invention somewhat varies depending on the method by which the active material is produced, and it can cover the range of 0.01–10%, preferably 0.01–1.8%.

The anode active material of this invention, which is used as such in the alkaline cell of this invention, may be produced by a number of methods typical of which are:

(1) a method for amalgamating zinc-indium powder (partially indium-cemented zinc powder), (2) a method for amalgamating zinc powder with indium amalgam and (3) a method for amalgamating a zinc-indium alloy in the powder form.

It is preferable that the anode active material of this invention be produced by forming powdery zinc-indium-mercury as amalgamated metal powder by the use of any one of the above three methods.

The method (1) may be carried out by, for example, dissolving metallic indium or an indium compound in an acid such as hydrochloric acid, heating the whole to evaporate the greater part of the excess acid as required and diluting the remaining solution with water so as to prepare an indium salt-aqueous solution having a predetermined indium concentration (for example, 0.1–5 g/l as indium). Then, zinc powder is immersed in the thus prepared solution to react the zinc and indium at a temperature of 80° C. or lower and for a reaction time of 1–60 minutes thereby attaching indium to the surface of the zinc powder. It is possible to vary the amount of indium to the zinc powder as required by varying the indium concentration in the indium salt solution, the reaction temperature, the reaction time and the like. The resulting zinc-indium powder prepared by attaching indium to the surface of the zinc powder is washed with water, dried or not dried and then amalgamated.

The amalgamation may be achieved by various methods, among which the following ones are preferred:

One of the preferred methods comprises immersing such zinc-indium powder as above in an alkali solution such as an aqueous solution of potassium hydroxide, preliminarily agitating the resulting mixture for 1-30 minutes, allowing metallic mercury to drop slowly into the mixture through small openings, agitating the whole for 30-120 minutes, washed with water and then dried at a low temperature of 30°-60° C. thereby to obtain zinc-indium-mercury powder. The preferable indium content of the thus obtained zinc-indium-mercury powder is 0.01-1%.

Another method comprises mixing indium with mercury to form indium amalgam and then amalgamating zinc powder with the thus formed indium amalgam. When the zinc powder is amalgamated with the indium amalgam, the amalgam will be contained in the zinc powder while the indium/mercury ratio in the indium amalgam is kept unchanged since mercury is capable of easily forming an amalgam not only with zinc but also with indium even at room temperature. It is accordingly possible to vary the indium and mercury contents in zinc powder by varying the indium content in indium amalgam. The amalgamation may be effected by various methods and is preferably identical with that previously mentioned. More particularly, the amalgamation is effected by immersing indium amalgam in an alkali solution to which zinc powder is added. It is preferable that the indium content of zinc-indium-mercury powder produced by this method be in the range of 0.01-5%.

Still another method comprises adding indium to melted zinc to prepare zinc-indium alloy powder and then amalgamating the thus prepared alloy powder to form zinc-indium-mercury powder.

Various methods are applicable to amalgamation, among which is preferred the same method as mentioned above, that is a method comprising adding mercury to an alkaline solution containing zinc-indium alloy powder. It is preferable that zinc-indium-mercury powder produced by this method have an 0.01-10% indium content.

With zinc-lead alloy powder (containing 0.005-1% of lead) instead of the zinc powder (containing not higher than 0.003% of lead), the aforesaid method may also be used without any trouble.

This invention will be better illustrated by the following examples wherein all the percentages are by weight unless otherwise specified.

EXAMPLE 1

An 0.3 g sample of indium metal was entirely dissolved in an excessive amount of hydrochloric acid, heated to remove the greater part of the excess hydrochloric acid by evaporation and then diluted with purified water to prepare 600 ml of an indium chloride solution having an indium concentration of 0.5 g/l. The thus obtained solution was incorporated with 250 g of a commercially available zinc powder (35-100 mesh) for cells or batteries and then agitated at 20° C. for 30 minutes to attach the indium to the surface of the zinc powder. The zinc-indium powder so obtained was washed with purified water, thrown into one liter of a 10% solution of potassium hydroxide, preliminarily agitated at 20° C. for 5 minutes and agitated at 20° C. for 60 minutes while slowly adding such an amount of metallic mercury as to correspond to a desired mercury content dropwise through small openings to effect amalgamation. After the end of the amalgamation, the zinc-indium powder so amalgamated was washed with water and then dried at 45° C. for 24 hours. In this manner, four kinds of zinc-indium-mercury powder having an 0.1% content of indium with four different mercury contents of 1%, 3%, 5% and 7%, respectively, were obtained by adjusting the mercury amount to be added.

The above procedure was followed except that a zinc-lead alloy powder containing 0.005% lead was used instead of the zinc powder and metallic mercury was added in such an amount as to attain a 1% content of mercury in the resulting alloy powder, thereby to obtain a zinc-lead-indium-mercury powder having an 0.005% content of lead, 0.1% content of indium and 1% content of mercury.

EXAMPLE 2

0.56 grams of indium and 5 grams of mercury were mixed together to prepare an indium amalgam having a 10% content of indium. Then, the thus prepared indium amalgam was used to amalgamate zinc powder in the same manner as in Example 1 thereby to obtain a zinc-indium-mercury powder having an 0.1% content of indium and a 1% content of mercury. Further, there was also prepared an indium amalgam having a 50% content of indium, after which the thus prepared indium amalgam was used for amalgamation of zinc powder in the same manner as in Example 1 thereby obtaining a zinc-indium-mercury powder having a 1% content of indium and a 1% content of mercury.

The above procedure was followed except that 0.1 gram of indium and 7.5 grams of mercury were used in the preparation of an indium amalgam having a 1.3% content of indium and a zinc-lead alloy powder having an 0.05% content of lead was used instead of the zinc powder, thereby to obtain a zinc-lead-indium-mercury powder having an 0.05% content of lead, 0.02% content of indium and 1.5% content of mercury.

EXAMPLE 3

A metallic indium piece was introduced into molten zinc and the melt was cooled and finely divided to prepare zinc-indium alloy powder having an 0.1% content of indium. The thus prepared zinc-indium alloy powder was amalgamated with mercury in the same manner as in Example 1 to obtain zinc-indium-mercury powder having an 0.1% content of indium and a 1% content of mercury.

In addition, indium was added to a melted zinc-lead alloy to prepare zinc-lead-indium alloy powder having an 0.1% content of lead and an 0.1% content of indium, after which the thus prepared alloy powder was amalgamated in the same manner as in Example 1 to obtain zinc-lead-indium-mercury powder having 0.1% lead, 0.1% indium and 1% mercury contents.

EXAMPLE 4

0.56 grams of thallium and 5 grams of mercury were mixed together to prepare a thallium amalgam having a 10% content of thallium. Then, the thus prepared thallium amalgam was used to amalgamate zinc powder in the same manner as in Example 1 thereby to obtain a zinc-thallium-mercury powder having an 0.1% content of thallium and a 1% content of mercury.

The above procedure was followed except that a zinc-lead alloy powder having a 1% content of lead was used instead of the zinc powder, thereby to obtain a zinc-lead-thallium-mercury powder having an 1% content of lead, 0.1% content of thallium and 1% content of mercury.

The thus obtained zinc-indium-mercury powder, zinc-lead-indium-mercury powder, zinc-thallium-mercury powder and zinc-lead-thallium-mercury powder were each used as the anode active material in a hydrogen gas evolution test. For comparison, conventional zinc-mercury powder samples having mercury contents 1, 3, 5 and 7% were used as the anode active materials, respectively, in the same test as above.

These gas evolution tests were carried out at 45° C. using 10 grams of each of said anode active materials and as the electrolyte 5 milliliters of a 40 wt.% aqueous solution of potassium hydroxide, saturated with zinc oxide. The results are as shown in Table 1.

TABLE 1

|  |  |  | Content (%) | | | | Gas evolution rate (ml/g · day) |
|---|---|---|---|---|---|---|---|
|  |  |  | Lead | Indium | Thallium | Mercury |  |
| Anode active material of this invention | Example 1 | (a) | — | 0.1 | — | 1 | $1.3 \times 10^{-3}$ |
|  |  | (b) | — | 0.1 | — | 3 | $1.2 \times 10^{-3}$ |
|  |  | (c) | — | 0.1 | — | 5 | $1.1 \times 10^{-3}$ |
|  |  | (d) | — | 0.1 | — | 7 | $1.1 \times 10^{-3}$ |
|  |  | (e) | 0.005 | 0.1 | — | 1 | $0.8 \times 10^{-3}$ |
|  | Example 2 | (a) | — | 0.1 | — | 1 | $1.1 \times 10^{-3}$ |
|  |  | (b) | — | 1.0 | — | 1 | $1.0 \times 10^{-3}$ |
|  |  | (c) | 0.05 | 0.02 | — | 1.5 | $0.8 \times 10^{-3}$ |
|  | Example 3 | (a) | — | 0.1 | — | 1 | $1.2 \times 10^{-3}$ |
|  |  | (b) | 0.1 | 0.1 | — | 1 | $1.1 \times 10^{-3}$ |
|  | Example 4 | (a) | — | — | 0.1 | 1 | $1.1 \times 10^{-3}$ |
|  |  | (b) | 1.0 | — | 0.1 | 1 | $0.9 \times 10^{-3}$ |
| Conventional anode active material | (a) |  | — | — | — | 1 | $5.0 \times 10^{-3}$ |
|  | (b) |  | — | — | — | 3 | $4.1 \times 10^{-3}$ |
|  | (c) |  | — | — | — | 5 | $1.3 \times 10^{-3}$ |
|  | (d) |  | — | — | — | 7 | $1.3 \times 10^{-3}$ |

It is seen from Table 1 that each of the anode active materials containing amalgamated indium according to this invention is effective with a remarkably decreased amount of mercury as compared with the conventional anode active material in terms of the hydrogen gas inhibiting effect.

Then, alkaline-manganese type cells respectively containing said active materials were tested for cell performance. The cell construction used was as follows:

(1) Cathode; 90 parts by weight of a commercially available manganese dioxide powder were mixed with 10 parts by weight of graphite and the resulting mixtures were pressure molded.

(2) Anode; Each of the anode active materials was placed on the cathode mix. A sheet of separator was placed between the two counter-electrodes. The amount of each anode active material so placed was 35 parts by weight.

(3) Electrolyte; A 40 wt.% aqueous solution of potassium hydroxide, saturated with zinc oxide, was used.

The thus prepared test cells were discharged on a 20-ohm load at 20° C., and the duration discharges were measured down to a cut-off voltage of 0.9 V. The discharge durations so measured were expressed in terms of an index number with a value of 100 for the conventional active material. The results are as shown in Table 2.

TABLE 2

|  |  |  | Content (%) | | | | Discharge duration (Cut-off Voltage: 0.9 V) |
|---|---|---|---|---|---|---|---|
|  |  |  | Lead | Indium | Thallium | Mercury |  |
| Anode active material of this invention | Example 1 | (a) | — | 0.1 | — | 1 | 100 |
|  |  | (b) | — | 0.1 | — | 3 | 104 |
|  |  | (c) | — | 0.1 | — | 5 | 104 |
|  |  | (e) | 0.005 | 0.1 | — | 1 | 105 |
|  | Example 2 | (a) | — | 0.1 | — | 1 | 109 |
|  |  | (c) | 0.05 | 0.02 | — | 1.5 | 105 |
|  | Example 3 | (b) | 0.1 | 0.1 | — | 1 | 105 |
|  | Example 4 | (a) | — | — | 0.1 | 1 | 103 |
|  |  | (b) | 1.0 | — | 0.1 | 1 | 105 |
| Conventional anode active material | (c) |  | — | — | — | 5 | 100 |

It is seen from Table 2 that the test cells containing the anode active material (containing amalgamated indium) according to this invention exhibited improved or at least the same discharge performances as compared with the test cell containing the conventional anode active material in spite of the fact that the anode active material according to this invention contained a remarkably decreased amount of mercury as compared with the conventional anode active material.

What is claimed is:

1. An anode active material composed of, by weight of the metals, of zinc powder or a zinc—0.005 to 1% lead alloy powder anfd 0.01 to 1.8% of indium or thallium, the metals being amalgamated to an extent that the mercury content is 1%.

2. An alkaline cell comprising, as the anode active material, at least one amalgamated metal powder which is a member selected from the group consisting of:
   (a) zinc powder and 0.01–1.8% indium or thallium, the amount of mercury 1%; and
   (b) zinc—0.005–1% lead alloy, 0.01–1.8% indium or thallium, the amount of mercury 1%.

3. The method of minimizing the evolution of hydrogen gas in an alkaline cell which consists of dissolving metallic indium or an indium compound in an aqueous acid solution to form an aqueous solution of an indium salt, immersing zinc powder or a zinc-lead alloy powder containing 0.005–1% lead whereby indium is attached to the zinc powder or to the zinc-lead alloy powder, drying said powder, immersing said zinc-indium powder or said zinc-lead alloy-indium powder in an aqueous potassium hydroxide solution, dropping metallic mercury into said aqueous potassium solution, to obtain an amalgamated powder, the amounts of zinc and indium or indium compound being so calculated whereby said amalgamated powder consists of zinc or zinc—0.005–1% lead alloy powder, mercury in the amount of 1% and indium in the amount of 0.01–1.8%, and making the anode active material in said alkaline cell of said amalgamated powder.

4. The method according to claim 3, wherein the amount of lead is 0.005%, the amount of mercury is 1.0% in said amalgamated metal powder and the amount of indium is 0.1%.

5. The method according to claim 3, wherein the amount of indium is 0.1%, the amalgamated metal powder is formed from zinc with 1.0% mercury.

6. The method of minimizing the evolution of hydrogen gas in an alkaline cell which consists of forming a thallium amalgam, reacting said thallium amalgam with zinc powder or with a zinc-lead alloy powder containing 0.005–1% lead to form an amalgamated powder of zinc-thallium or zinc-lead-thallium alloy, the amounts of mercury and thallium being so calculated whereby said powder contains 1% mercury and 0.01–1.8% thallium and making the anode active material in said alkaline cell of said amalgamated powder.

7. The method according to claim 6, wherein the amount of lead is 1.0%, the amount of mercury is 1.0% in said amalgamated metal powder and the amount of thallium is 0.1%.

* * * * *